US009310503B2

(12) United States Patent
Rentsch et al.

(10) Patent No.: US 9,310,503 B2
(45) Date of Patent: Apr. 12, 2016

(54) METHODS TO PROCESS SEISMIC DATA CONTAMINATED BY COHERENT ENERGY RADIATED FROM MORE THAN ONE SOURCE

(75) Inventors: Susanne Rentsch, Brighton (GB); Wouter Gerrit Brouwer, Uckfield (GB)

(73) Assignee: WESTERNGECO L.L.C., Houston, TX (US)

( * ) Notice: Subject to any disclaimer, the term of this patent is extended or adjusted under 35 U.S.C. 154(b) by 603 days.

(21) Appl. No.: 12/906,532

(22) Filed: Oct. 18, 2010

(65) Prior Publication Data

US 2011/0096625 A1    Apr. 28, 2011

Related U.S. Application Data

(60) Provisional application No. 61/254,503, filed on Oct. 23, 2009.

(51) Int. Cl.
*G01V 1/36* (2006.01)
*G01S 3/808* (2006.01)

(52) U.S. Cl.
CPC .................. *G01V 1/364* (2013.01); *G01V 1/36* (2013.01); *G01S 3/8083* (2013.01)

(58) Field of Classification Search
CPC ........... G01S 5/18; G01S 3/8083; G01V 1/36; G01V 1/364
USPC ............................... 367/21, 38, 118, 124, 129
See application file for complete search history.

(56) References Cited

U.S. PATENT DOCUMENTS

| 4,547,869 | A  | * | 10/1985 | Savit ............................. 367/130 |
| 4,800,539 | A  |   | 1/1989  | Corn et al. |
| 4,910,718 | A  | * | 3/1990  | Horn ............................. 367/124 |
| 5,924,049 | A  |   | 7/1999  | Beasley et al. |
| 6,138,075 | A  |   | 10/2000 | Yost |
| 6,205,403 | B1 |   | 3/2001  | Gaiser et al. |
| 6,545,944 | B2 |   | 4/2003  | de Kok |
| 6,751,559 | B2 | * | 6/2004  | Fookes et al. .................... 702/17 |
| 7,327,852 | B2 | * | 2/2008  | Ruwisch ....................... 381/356 |
| 7,679,990 | B2 | * | 3/2010  | Herkenhoff et al. ............ 367/23 |
| 7,869,303 | B2 | * | 1/2011  | Kinkead ......................... 367/21 |
| 7,916,576 | B2 | * | 3/2011  | Beasley et al. .................. 367/38 |
| 2004/0078144 | A1 |   | 4/2004  | Cauwenberghs et al. |
| 2005/0027454 | A1 | * | 2/2005  | Vaage et al. .................... 702/17 |
| 2008/0159074 | A1 | * | 7/2008  | Guis .............................. 367/40 |
| 2008/0312878 | A1 |   | 12/2008 | Robertsson et al. |

(Continued)

FOREIGN PATENT DOCUMENTS

| WO | 2009085474 | 7/2009 |
| WO | 2009117653 | 9/2009 |

OTHER PUBLICATIONS

International Search Report and Written Opinion of PCT Application No. PCT/US2010/053147 dated Jun. 30, 2011: pp. 1-12.

(Continued)

*Primary Examiner* — Ian J Lobo
(74) *Attorney, Agent, or Firm* — Abimbola Bukoye

(57) ABSTRACT

This invention discloses methods of processing data using a computer to separate out geophysical exploration response at receivers corresponding to one source among many sources by determining at least one spatio-temporal variant directional propagation attribute of the responses at receivers corresponding to the one source and by decomposition or filtering process using the determined attribute.

16 Claims, 9 Drawing Sheets

(56) References Cited

U.S. PATENT DOCUMENTS

| | | | |
|---|---|---|---|
| 2009/0012779 A1* | 1/2009 | Ikeda et al. | 704/205 |
| 2009/0161488 A1 | 6/2009 | Ferber et al. | |
| 2009/0168600 A1* | 7/2009 | Moore et al. | 367/38 |
| 2009/0238036 A1 | 9/2009 | Robertsson et al. | |
| 2009/0251995 A1 | 10/2009 | Nichols | |
| 2010/0097885 A1* | 4/2010 | Moore | 367/21 |
| 2010/0106440 A1* | 4/2010 | Richmond | 702/71 |
| 2010/0274492 A1 | 10/2010 | Rentsch et al. | |
| 2012/0269034 A1* | 10/2012 | Neelamani et al. | 367/73 |

OTHER PUBLICATIONS

Akerberg et al.,"Simultaneous source separation by sparse Radon transform," SEG Las Vegas Annual Meeting, 2008: pp. 2801-2805.

Gao et al., "Fast Beam Migration—A Step Toward Interactive Imaging," SEG New Orleans Annual Meeting, 2006: pp. 2470-2474.

Hua et al., "Parsimonious 2D prestack Kirchhoff depth migration," Geophysics, May-Jun. 2003, vol. 68(3): pp. 1043-1051.

Mao et al., "P093: High-Resolution Dip Estimation Using Plane-Wave Annihilator Filters," EAGE 68th Conference & Exhibition, Jun. 2006: pp. 1-5.

Tillmanns et al., "Focusing in Prestack Isochrone Migration Using Instantaneous slowness Information," Pure appl. geophys., 1999, vol. 156: pp. 187-206.

Beasley, et al., "A new look at marine simultaneous sources", The Leading Edge, vol. 27, No. 7, Jul. 1, 2008, pp. 914-917.

Search Report issued in EP10825503.5 on Dec. 18, 2014, 7 pages.

* cited by examiner

METHODS TO PROCESS SEISMIC DATA CONTAMINATED BY COHERENT ENERGY RADIATED FROM MORE THAN ONE SOURCE

CROSS-REFERENCE TO RELATED APPLICATIONS

The present application claims priority under 35 U.S.C. §119(e) to U.S. Provisional Application Ser. No. 61/254,503 filed on Oct. 23, 2009, with the same title and by the same inventors.

BACKGROUND OF THE INVENTION

1. Field of the Invention

This invention relates geophysical exploration for hydrocarbon and other valuable materials and related data processing.

2. Description of the Related Art

Geophysical exploration or seismic exploration in particular involves surveying subterranean geological formations for hydrocarbon deposits or other valuable materials. A survey typically involves deploying source(s) and receivers at predetermined locations. The sources generate waves, which propagate into the geological formations and are changed by their interaction with different geological formations. Part of the waves emitted by the sources reaches the receivers. In response, the receivers generate electrical signals to produce survey data. Analysis of the survey data can then indicate the characteristics of the subterranean geological formations, such as the presence or absence of probable locations of hydrocarbon deposits.

Depending on the location where a survey takes place, there are surveys in sea, on land or in transition zones. Marine seismic surveying is a method for determining the structure of subterranean formations underlying bodies of water. Marine seismic surveying may typically utilize seismic energy sources and seismic receivers located in the water which may be either towed behind a vessel or positioned on the water bottom from a vessel. The energy source may typically be an explosive device or compressed air system which generates seismic energy, which then propagates as seismic waves through the body of water and into the earth formations below the bottom of the water. As the seismic waves strike interfaces between subterranean formations, a portion of the seismic waves may reflect back through the earth and water to the seismic receivers, to be detected, transmitted, and recorded. The seismic receivers typically used in marine seismic surveying may be pressure sensors, such as hydrophones. Additionally, motion sensors, such as accelerometers, may be used. Both the sources and receivers may be strategically repositioned to cover the survey area.

Land seismic surveying is done on land. The energy sources are typically vibratory sources (vibrators). The vibrators produce a pressure signal that propagates through the earth into the various subsurface layers. Here elastic waves are formed through interaction with the geologic structure in the subsurface layers. Elastic waves are characterized by a change in local stress in the subsurface layers and a particle displacement, which is essentially in the same plane as the wavefront. Acoustic and elastic waves are also known as pressure and shear waves. Acoustic and elastic waves are collectively referred to as the seismic wavefield.

REFERENCES

Akerberg, P., G. Hampson, J. Rickett, H. Martin, and J. Cole, Simultaneous source separation by sparse Radon transform, 2008, SEG expanded abstracts Ferber R. and Velasco L., Method to estimate ray parameter for seismograms, US filed patent, Number 53.0072-US. December 2007.

Fookes, Gregory Peter, Van Borselen, Roald Gunnar, Ali, Jaafar, Brittan, John and Hoogeveen, Jeroen Hubertus Maria, Method for suppressing noise from seismic signals by source position determination, 2004, U.S. Pat. No. 6,751,559

Gaiser, J. E. and Barr, F. J., 2001, Method for determining horizontal geophone orientation in ocean bottom cables, U.S. Pat. No. 6,205,403

Gao, F., Zhang, P., Wang, B., and Dirks, V., 2006, Fast Beam migration—a step toward interactive imaging. SEG Technical Program Expanded Abstracts, 25, no. 1, 2470-2474.

Hua, B., and McMechan, G. A., 2003, Parsimonious 2d prestack Kirchhoff depth migration, Geophysics, 68, no. 3, 1043-1051.

De Kok, Robbert Jasper, Method for acquiring and processing of data from two or more simultaneously fired sources, 2001, U.S. Pat. No. 6,545,944

Tillmanns, M., and Gebrande, H., 1999, Focusing in Prestack Isochrone Migration Using Instantaneous Slowness Information, Pure Appl. Geophys., 156, no. 1-2, 187-206.

Rentsch, S. and van Manen, D. J., 2008, Arrival Time, Amplitude, and Propagation Direction Estimation from Seismic Data, U.S. Ser. No. 12/429,288, filed on 24 Apr., 2009.

Robertsson, J. O. A., van Manen, D. J., and Rentsch, S., 2007, Determining directional propagation attributes of a seismic event, WO2009117653

Mao, W. J. and Fletcher, R., 2006, High-resolution dip estimation using plane-wave annihilator filters, 68th EAGE expanded abstracts

BRIEF SUMMARY OF THE INVENTION

This invention discloses methods of processing data using a computer to separate out geophysical exploration response at receivers corresponding to one source or remove responses corresponding to other non-selected sources by determining at least one spatio-temporal variant directional propagation attribute of the responses at receivers corresponding to the selected source and separating out the response corresponding to the selected source by decomposition or filtering process using the determined attribute.

BRIEF DESCRIPTION OF THE SEVERAL VIEWS OF THE DRAWINGS

A better understanding of the invention can be had when the following detailed description of the preferred embodiments is considered in conjunction with the following drawings, in which.

DETAILED DESCRIPTION OF THE INVENTION

This invention relates to methods of the separation of seismic signals that may include coherent signals radiated from more than one source. Examples for such a scenarios are e.g., simultaneous source acquisition or seismic interference.

In methods described below, spatio-temporal variant directional propagation attribute information of wavefields recorded with single or multi-component receivers is used. The spatio-temporal variant directional propagation attributes may include incidence angle and azimuth information. The attributes are computed as a function of time and space. On the basis of such attributes, each event in the seismic record is associated one source. The separation can then be performed using appropriate filters.

The methods utilizing spatio-temporal variant information can be used for separating data of geophysical surveys, be it on land or in sea or in transition zones. For simplicity of discussion, only examples applied to marine seismic survey data are discussed below.

Marine Seismic Survey with Simultaneous Shooting in General

Figure 1:
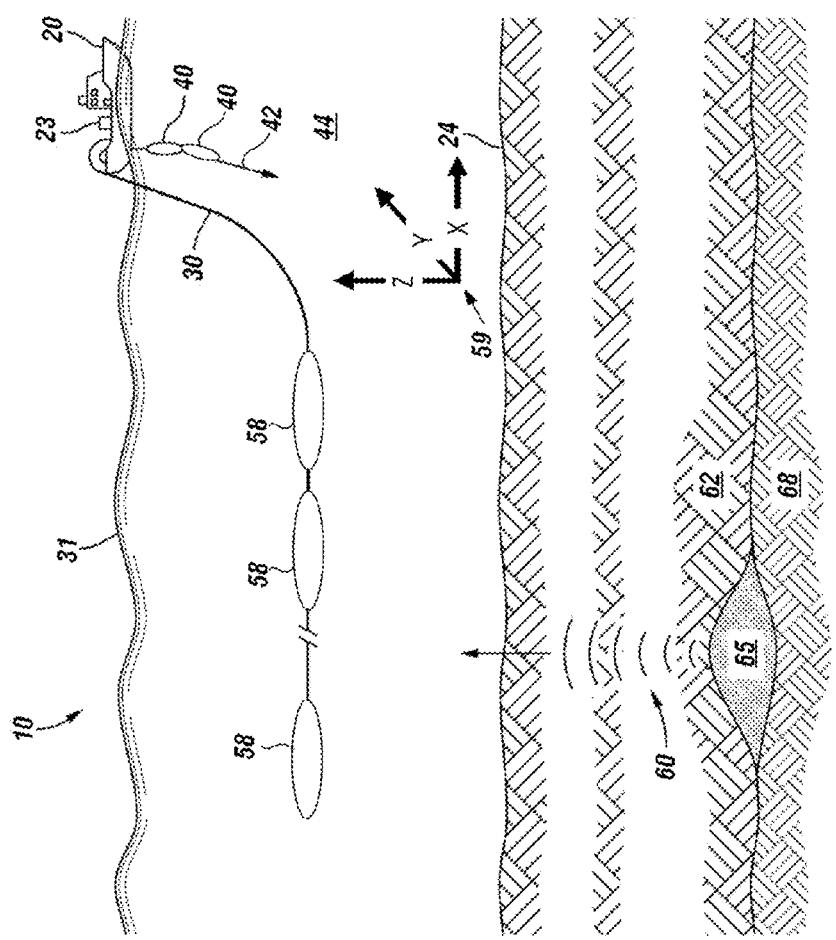
FIG. 1 shows a typical marine survey.

FIG. 1 depicts a marine-based seismic data acquisition system 10. In the system 10, a survey vessel 20 tows one or more seismic streamers 30 (one exemplary streamer 30 being depicted in FIG. 1) behind the vessel 20. It is noted that the streamers 30 may be arranged in a spread in which multiple streamers 30 are towed in approximately the same plane at the same depth. As another non-limiting example, the streamers may be towed at multiple depths, such as in an over/under spread, for example.

The seismic streamers 30 may be several thousand meters long and may contain various support cables (not shown), as well as wiring and/or circuitry (not shown) that may be used to support communication along the streamers 30. In general, each streamer 30 includes a primary cable into which is mounted seismic receivers that record seismic signals. The streamers 30 contain seismic receivers 58, which may be, hydrophones which can acquire pressure data, geophones or accelerometers which can acquire particle motion data, or the combination of the above. Examples of particle motions include one or more components of a particle displacement, one or more components (inline (x), crossline (y) and vertical (z) components (see axes 59, for example)) of a particle velocity, or one or more components of particle acceleration.

Depending on the particular survey need, the multi-component seismic receiver may include one or more hydrophones, geophones, particle displacement sensors, particle velocity sensors, accelerometers, pressure gradient sensors, or combinations thereof. It is noted that the multi-component seismic sensor may be implemented as a single device (as depicted in FIG. 1) or may be implemented as a plurality of devices. A particular multi-component seismic receiver may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, a particular point, seismic data indicative of the pressure data with respect to the inline direction.

The marine seismic data acquisition system 10 includes one or more seismic sources 40 (two source 40 being depicted in FIG. 1), such as air guns and the like. In some surveys, the seismic sources 40 may be coupled to, or towed by, the survey vessel 20. Alternatively, in other embodiments of the invention, the seismic sources 40 may operate independently of the survey vessel 20, in that the sources 40 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic sources 40 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are acquired by the sources 40 produce corresponding reflected acoustic signals, or pressure waves 60, which are sensed by the seismic receivers 58. It is noted that the pressure waves that are received and sensed by the seismic receivers 58 include "up going" pressure waves that propagate to the receivers 58 without reflection, as well as "down going" pressure waves that are produced by reflections of the pressure waves 60 from an air-water boundary 31.

The seismic receivers 58 generate signals (digital signals, for example), called "traces," which indicate the acquired measurements of the pressure wavefield and particle motion. The traces are recorded and may be at least partially processed by a signal processing unit 23 that is deployed on the survey vessel 20. For example, a particular seismic receiver 58 may provide a trace, which corresponds to a measure of a pressure wavefield by its hydrophone 55; and the receiver 58 may provide one or more traces that correspond to one or more components of particle motion.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations.

A particular seismic source 40 may be formed from an array of seismic source elements (such as air guns, for example) that may be arranged in strings (gun strings, for example) of the array. Alternatively, a particular seismic source 40 may be formed from one or a predetermined number of air guns of an array, may be formed from multiple arrays, etc. Regardless of the particular composition of the seismic sources, the sources may be fired in a particular time sequence during the survey.

As described in more detail below, the seismic sources 40 may be fired in a sequence such that multiple seismic sources 40 may be fired simultaneously or near simultaneously in a short interval of time so that a composite energy signal that is sensed by the seismic receivers 58 contain a significant amount of energy from more than one seismic source 40. In other words, the seismic sources interfere with each other such that the composite energy signal is not easily separable into signals that are attributed to the specific sources. The data that is acquired by the seismic receivers 58 is separated, as described below, into datasets that are each associated with one of the seismic sources 40 so that each dataset indicates the component of the composite seismic energy signal that is attributable to the associated seismic source 40.

In a conventional towed marine survey, a delay is introduced between the firing of one seismic source and the firing of the next seismic source, and the delay is sufficient to permit the energy that is created by the firing of one seismic source to decay to an acceptable level before the energy that is associated with the next seismic source firing arrives. The use of such delays, however, imposes constraints on the rate at which the seismic data may be acquired. For a towed marine survey, these delays also imply a minimum inline shot interval because the minimum speed of the survey vessel is limited.

The use of simultaneously-fired or near-simultaneously-fired seismic sources in which signals from the sources interfere for at least part of each record, has benefits in terms of acquisition efficiency and inline source sampling. For this simultaneous-source technique to be useful, however, the acquired seismic data must be separated into the datasets that are each uniquely associated with one of the seismic sources. Conventional techniques for enabling the separation of interfering seismic sources makes use of the source firing time, spread and source geometry etc.

In U.S. Pat. No. 5,924,049, a method is disclosed, where the method separates seismic data based on the geometry. The seismic data is acquired from marine streamer geometry with two sources firing simultaneously off of both ends of the spread. The data is dip-filtered by known methods to remove the effects of the signal from the other source.

In U.S. Pat. No. 6,751,559, U.S. Pat. No. 6,545,944 and WO2009085474, more methods bases on source firing timing are disclosed. U.S. Pat. No. 6,751,559 disclosed a method includes determining an arrival time of a noise event at each of a plurality of seismic receivers, estimating a position of the noise source from the arrival times, and attenuating the noise event from the signals detected by the seismic receivers. U.S. Pat. No. 6,545,944 disclosed methods of predefined time delays between sources such that the energy from the interfering sources can be made to stack out. WO2009085474 disclosed methods using the knowledge of the time delays between sources to perform a decomposition of the recorded data into data associated with each source using some transforms, e.g. Radon transforms.

It is found that using spatio-temporal variant directional propagation attribute information separating the wavefield recorded is much easier and much more efficient.

It is noted that in the description, the data that contain multiple sources "common record gathers" because the term "common shot gathers" does not seem appropriate anymore if the data contain signal from more than one source.

In contrast to the other methods (e.g. WO2009085474), the current methods use the data in the common record domain where the signals radiated from different sources can be coherent or non-coherent. The actual source positions can be used but are not required to be known as it is often the case for seismic interference. So source positions are not a prerequisite of the method, nor is it necessary to perform calculations to determine such knowledge.

In these methods, only wavefield propagation direction is needed, i.e. incidence angles or slowness vector components and azimuths, in a spatio-temporal variant manner for one or more record gathers. Various methods can be used to determine these wavefield propagation directions.

Figure 2:
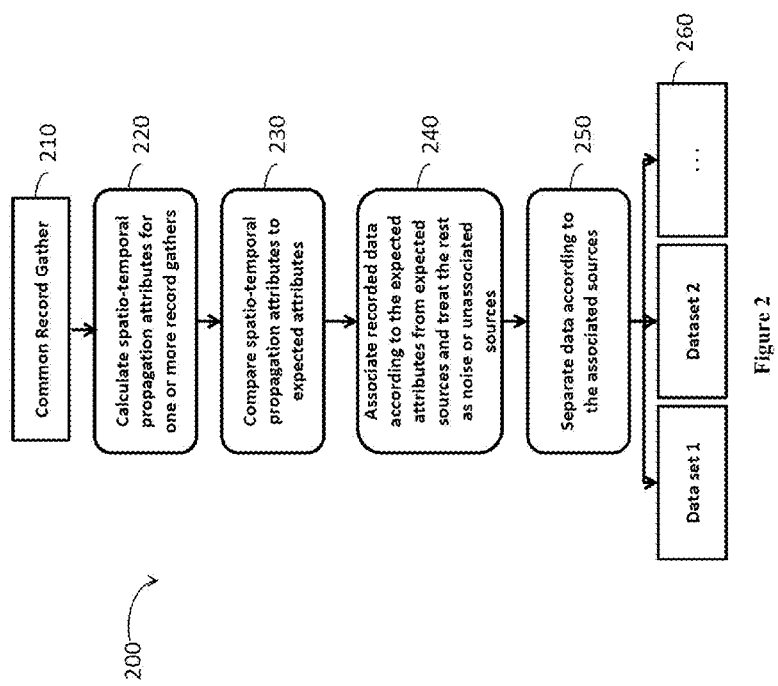
FIG. 2 shows a diagram of one method.

FIG. 2 shows a flow diagram of one method 200. At step 210, all data from all record gathers corresponding to all sources are collected. The data can be raw or pre-processed, single component or multi-component. At step 220, the spatio-temporal propagation attributes for one or more record gathers are calculated. In case where a particular source is known and its rough location is known, then at step 230, the calculated attributes are compared to a range of attributes associated with that source. At step 240, the recorded data with the expected attributes are associated with that source. At step 250, the recorded data with the expected attributes are separated out from all data. At step 260, the dataset corresponding to source 1 is separated out. Similarly, dataset corresponding to other sources can also be separated out. In some cases where the source position or even the identity of the source is not known, then steps 230 and 240 may be replaced with other steps to identify events that might be associated with a particular source at some location. For example, a source and its direction could be identified using multiple adjacent record gathers. To carry out the steps, there are many ways, as will be described below.

Determine a Spatio-Temporal Variant Direction Propagation Attribute

There are many ways to determine or calculate a spatio-temporal variant direction propagation attribute, including at least ways based on inline-crossline slowness, matching pursuit method, or polarization analysis.

Figure 3:
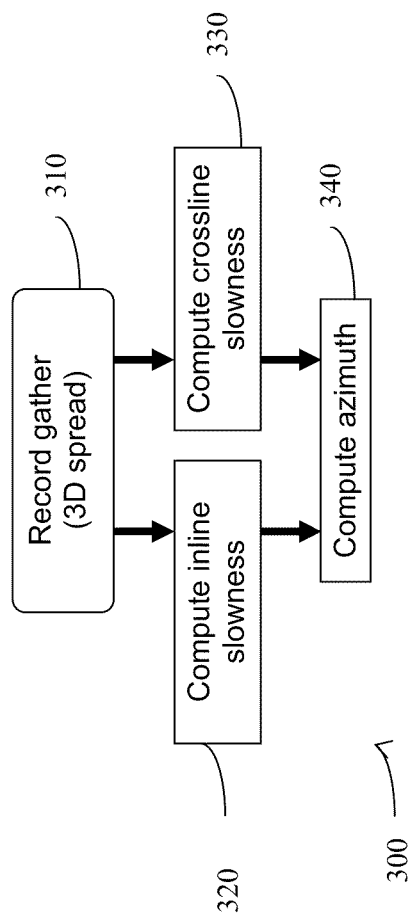
FIG. 3 shows one method to calculate the azimuth information of signals.
Figure 4:
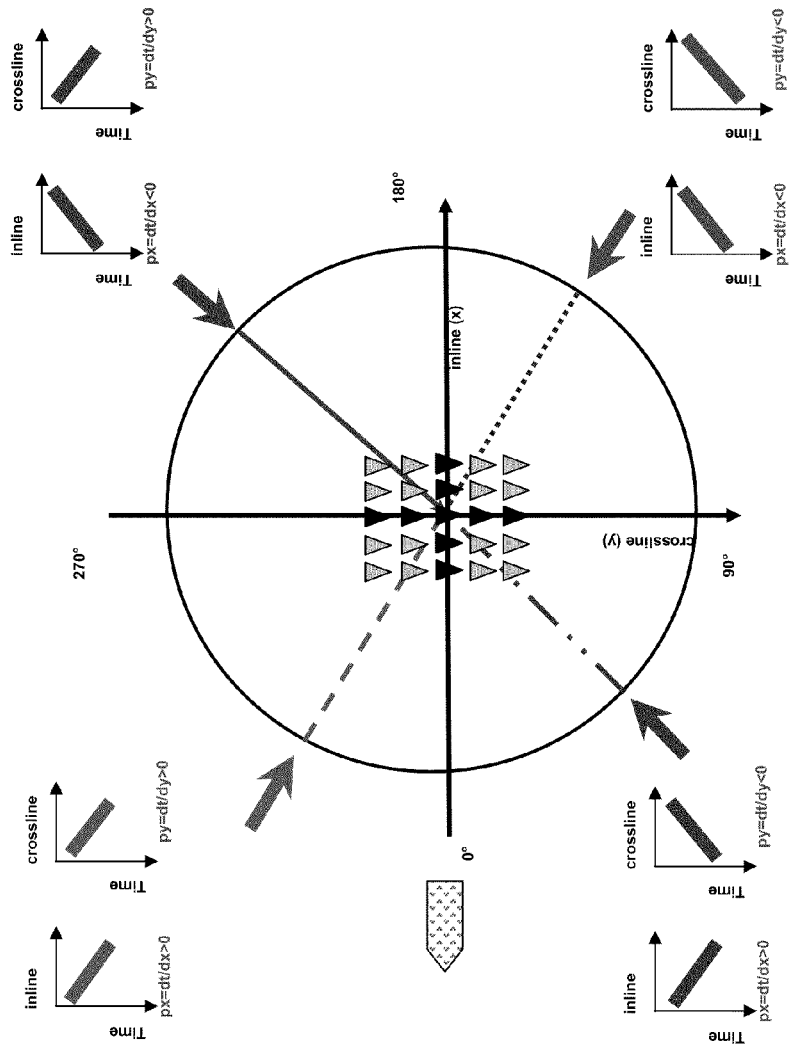
FIG. 4 shows the azimuth resolution using the sign of the in-line and crossline slowness information.

FIGS. 3 and 4 describe a method to determine propagation direction, e.g. azimuth. FIG. 3 depicts a flow diagram of one method 300 of finding azimuth. In step 310, all record gathers in the 3D spread of a survey are collected. Steps 320 and 330 are to calculate the time variant inline slowness $p_x(x,t)$ and crossline slowness $p_y(x,t)$ information for each receiver in the common record gather. Several algorithms can be used to calculate slowness information, for instance one can use *Semblance, Local Slant Stack and Multi-Channel-Crosscorrelation* (see e.g., Tillmanns and Gebrande, 1999; Hua and McMechan, 2003; Gao et al, 2006) or other sophisticated methods as proposed by Ferber and Velasco, (2007), and Mao and Fletcher, (2006). The azimuth $\theta(x,t)$ information can then be calculated in the following way using the inline and crossline slowness information in step 340:

$$\theta(x, t) = \tan^{-1}\left(\frac{p_y(x, t)}{p_x(x, t)}\right) \qquad (1)$$

This azimuth calculation does not give the desired 360° resolution. In order to obtain full azimuth resolution the sign of the inline and crossline slowness information can be taken into account as illustrated in FIG. 4. Anybody skilled in the art will appreciate that changing the directional convention may change the quadrant conventions but this changing will not limit the azimuth resolution. Furthermore, the azimuth resolution can also be obtained by cross-correlating the pressure component with the inline particle velocity component. If the inline particle velocity component is not measured directly it can be calculated, for example, from the inline spatial derivative of the pressure which is usually densely sampled inline. Such a procedure is often performed for the orientation of seabed receivers (e.g., Gaiser and Barr, 2001).

FIG. 4 depicts one simple method of obtaining full azimuth resolution with the sign of the inline/crossline slowness information. In the directional convention shown in FIG. 4, where the tow vessel traveling direction is 0 degree direction, the azimuth quadrants are:

| Inline slowness sign | Crossline slowness sign | Azimuth quadrant |
| --- | --- | --- |
| Positive | Negative | First, 0-90 |
| Negative | Negative | Second, 90-180 |
| Negative | Positive | Third, 180-270 |
| Positive | Positive | Fourth, 270-360 |

Other optional steps may be applied. For instance, before the crossline slowness estimation, the signal-to-noise ratio can be improved via filtering, group forming or stacking methods. Furthermore, a data regularization inline may improve the crossline slowness estimation because it maps crossline data samples onto a straight line which aids some of the algorithms mentioned above.

It is noted that in this method, only single-component 3D survey data are needed. The single component may be the pressure acquired by a typical hydrophone. Or the single component can be a particle motion. When multi-component data are available one or more components can be used.

Many other methods exist to calculate the spatio-temporal variant incident angles and azimuth, depending on the available data. For example, when multi-component data are available, the methods described in patent applications, Ser. No. 12/429,288 (Rentsch and van Manen, (2008)), and publication No. US20090238036 (Robertsson et. al. 2008), may be used. Both applications are assigned to the current assignee and are incorporated herein by reference. Both applications proposed methods take advantage of multi-component recordings but are not limited to multi-component recordings. When multi-component data are available, there is no limitation of 3D survey, (e.g. the data from only one receiver is to sufficient to find an attribute). Robertsson et. al. 2008 proposed a method to process multi-component data to determine a value indicative of an attribute of an event based on the data.

Rentsch and van Manen, (2008) proposed a matching pursuit based approach that calculates wavefield propagation directions and decomposes the data into individual events. The technique includes determining a candidate event for an observed wavefield quantity based at least in part on a source wavelet and a candidate value for at least one directional attribute quantity of an event; correlating the candidate event with the observed wavefield quantity; and determining an event time based on the correlating. One advantage of the method is that it allows decomposing overlapping events and resolving their individual propagation directions.

Multi-component data may also allow for polarization analysis while matching pursuit techniques or slowness vector measurements can be obtained from multi-component data as well as single component data. The more data are available, the more choices are available to choose from to determine the spatio-temporal variant directional propagation attributes.

Once the spatio-temporal variant propagation direction attributes, such as incidence angles and azimuths, are determined, they can then be further used to associate the corresponding signal with its corresponding source. Many methods can be used to make the association and ultimately separate the events corresponding to a single source out of the raw data that contains all responses corresponding to all sources.

Figure 5:
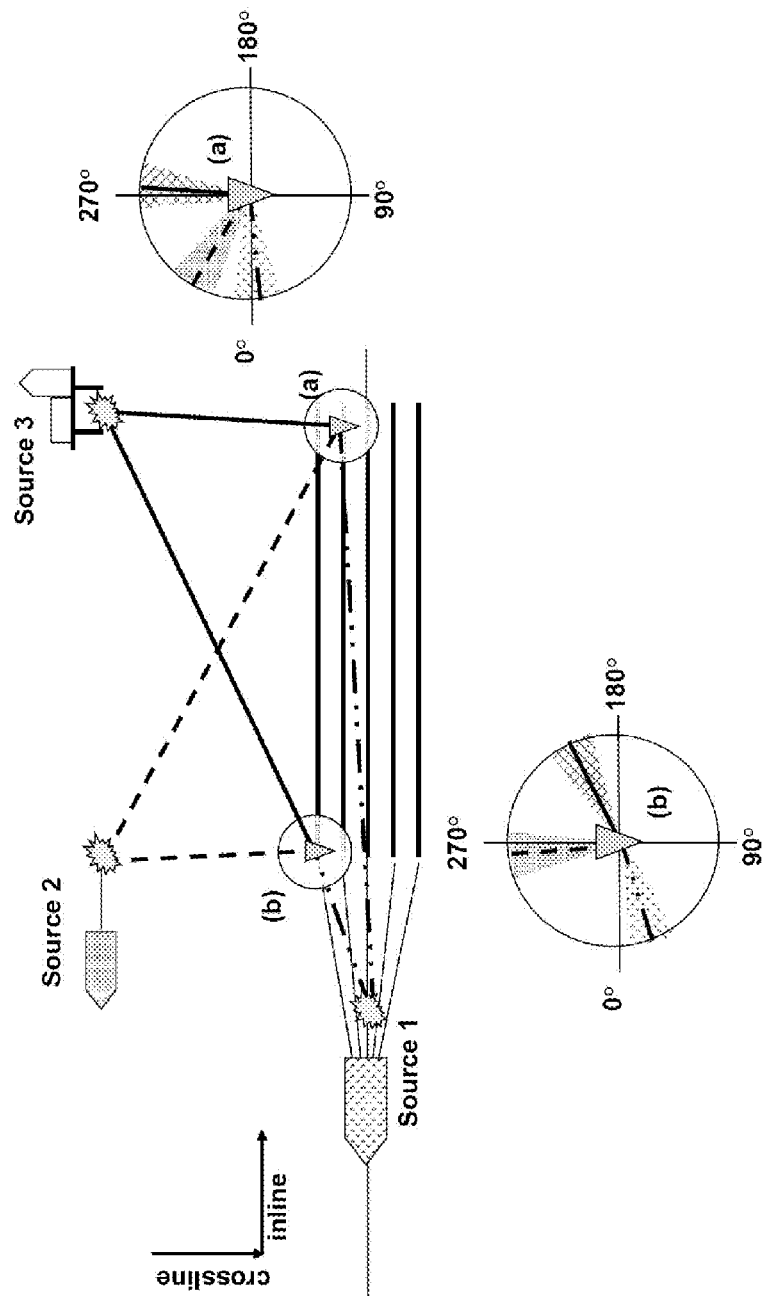
FIG. 5 shows one source-receiver geometry based on azimuth selection. Three sources are present.
Figure 8:
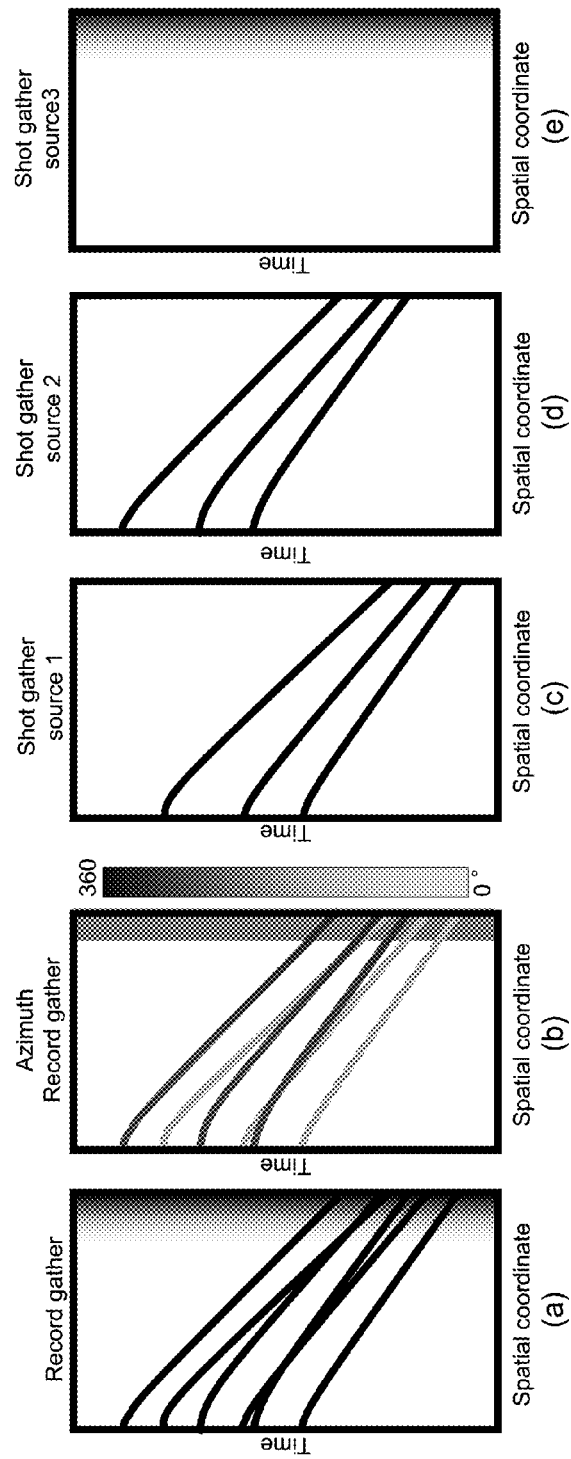
FIG. 8 illustrates the signal separation using spatio-temporal variant directional propagation attributes of signals from three different sources.
Figure 9:
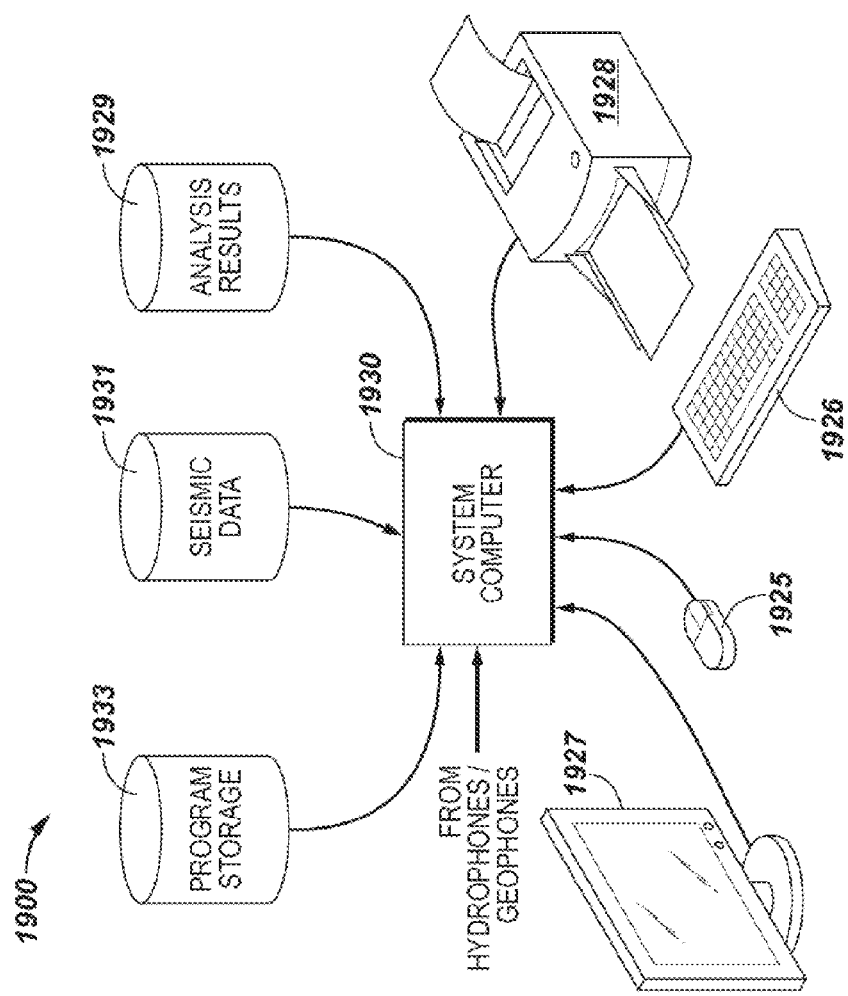
FIG. 9 shows a block diagram of a typical data processing system implementing the data processing methods.

One association process can be based on geometry considerations. FIG. 5 shows one example of how to associate signals with a source according to the signal azimuth signature. In this example, three sources are illustrated. Source 1 and source 2 depict two air guns used, for instance, in a simultaneous source acquisition scenario or in a seismic interference scenario where the signal of two independent acquisitions interferes. Source 3 depicts an environmental source, for instance, a rig which may emit drilling noise or production noise. A sketch of a common record gather recorded in such a scenario is shown in FIG. 8, panel a. The recorded signal is a superposition of signals emitted from air guns source 1 and source 2 and signals emitted from an environmental source 3 (here a rig). The signal that is associated with an airgun may consist of individual events including a direct wave, reflections, refractions, multiples etc. In contrast to the airgun radiated signal, the environmental noise may or may not consist of individual events and may only have significant amplitudes in parts of the record gather. For instance signals emitted by a drilling rig may rather look like a continuous event and not like individual events (FIG. 8, the progressively darker grey area on the right side of the panel a).

FIG. 8 depict the signal separation based on attributes using a method showing in FIG. 2. From left to right: panel a is common record gather containing signal from three different sources, panel b shows attributes (here spatio-temporal variant azimuth) of the common record gather, panel c shows signal associated with attributes that correspond to source 1, panel d shows signal associated with attributes that correspond to source 2, and panel e signal associated with attributes that correspond to source 3.

In FIG. 5, a survey vessel tows a source 1 and streamers, where two receivers (a) and (b) are highlighted. Receiver (a) is illustrated as a triangle at the end of a second streamer, and receiver (b) is illustrated as a triangle at the beginning of a first streamer. A source 2 travels along side the streamer at some distance. The source 2 could be a second source as in a simultaneous shooting survey, or it could be an interfering source in a separate and unrelated survey. Within the same survey area, there are other sources, such as source 3, which can be an oil production platform. On the right hand side of FIG. 5 shows the azimuth distribution of signals due to the various sources at receiver (a). For receiver 1, the corresponding azimuth is near 0 degree; for source 2, it is about 330 degrees and for source 3, about 270 degrees. At receiver location (b), for source 1, the corresponding azimuth is about 20 degrees; for source 2, about 280 degrees and for source 3, about 210 degrees. In some methods, only one attribute, e.g. the azimuth is identified and used.

In most cases, it is assumed that at least the source positions of one's own acquisition are known, so a range of expected azimuths for each receiver in the recording system (e.g. streamer spread) is known. The exact positions of the sources are not needed. A rough direction of a source is sufficient. As shown in FIG. 5, the source direction could be in a range, for example, at receiver (b), for source 1, the azimuth could be in the range of 25-40 degrees; for source 2, it could be in the range of 260-290 degrees; for source 3, it could be 200-230 degrees; the similar ranges at receiver (a) for the three sources are 355-15, 310-330, 250-280, In case where a source is not known, spatio-temporal variant directional propagation attributes for signals originating from the unknown source can still be determined by one of the methods described earlier.

On the basis of expected attributes, the associate events at least with the selected sources can be decomposed accordingly. Remaining events that cannot be associated can be treated as noise or as unassociated signal.

Figure 6:
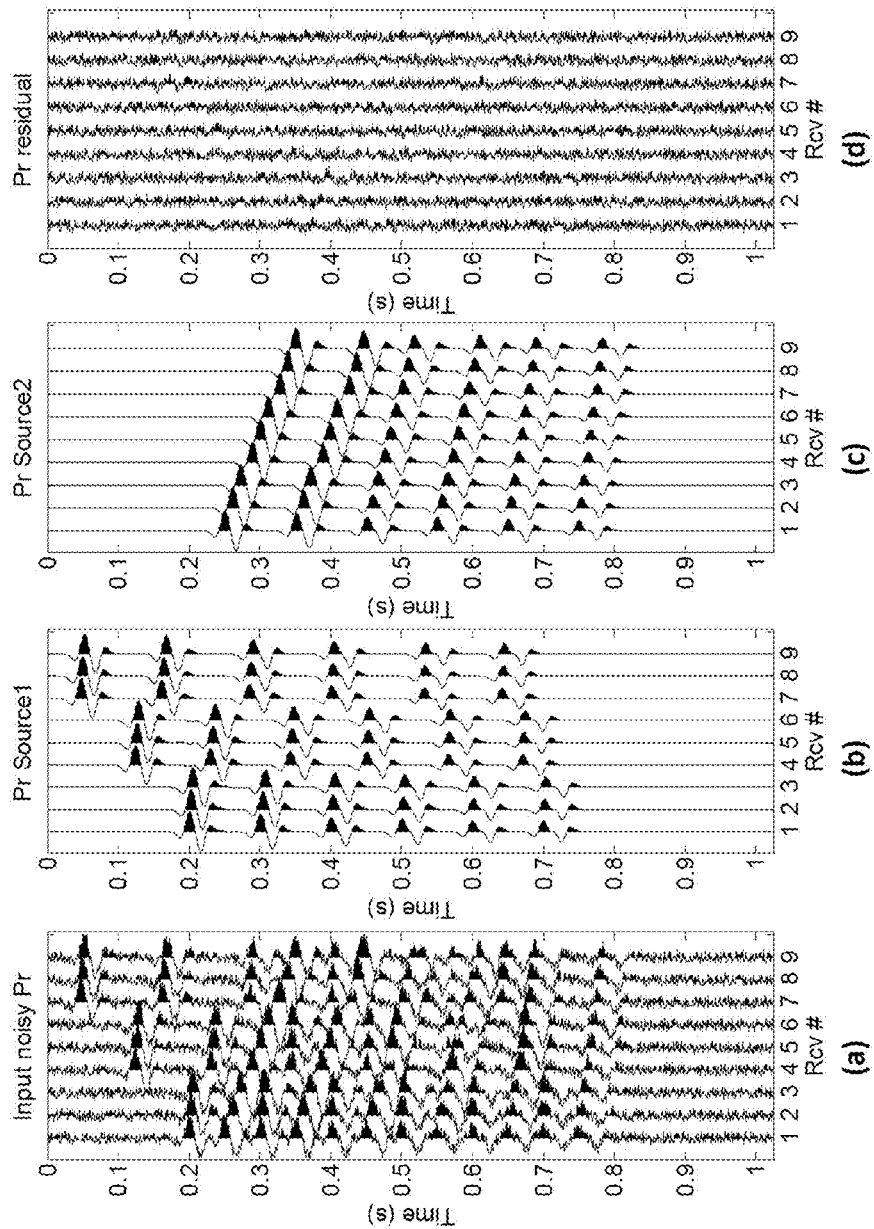
FIG. 6 shows an example of simultaneous source separation for pressure components for several receivers.

Separation Method, Iterative Subtraction Via Matching Pursuit:

A matching pursuit technique as described in Rentsch and van Manen, 2008, iteratively decomposes the attributes of multiple events even if they are overlapping. During each iteration, the error between a propagation direction dependent synthetic wavelet and the observed data is minimized. The parameters (i.e., arrival time, amplitude, incidence angle and azimuth) that form the minimum residual are considered to describe an event. The event is removed from the input data using the synthetic wavefield at the receiver locations in order to prepare the data for the next iteration step. Using the obtained parameters one can sort the event in its corresponding shot gather and output the upgoing part, the downgoing part or the total synthetic wavefield at a desired position (e.g., the location of the input stations or even at any location between them). An example of results of a matching pursuit based separation is shown in FIG. 6. The shown example simulates signals as recorded in the vicinity of receiver (b) in FIG. 5. The signal from both sources have similar incidence angles but differed in azimuth is indicated in FIG. 8 panel b.

FIG. 6 shows a matching pursuit based simultaneous source separation for the pressure component. Input data are shown for 9 receivers located in 3 different streamers (1-3 corresponds to streamer 1, 4-6 to streamer 2 and 7-9 to streamer 3, respectively.) From left to right, the four panels are: a) noise-contaminated pressure component before inversion; 2) pressure component associated with source 2 (azimuth range from 260-290°); 3) pressure component associated with source 1 (azimuth range from 25-40°); 4) residual not matched by the matching pursuit algorithm. In this example, it is possible separate the responses using only the azimuth information.

One can take advantage considering spatio-temporal-variant wavefield propagation directions for multiple adjacent shots. The wavefield propagation directions should include similar incidence angles and azimuths at least for known source signal. Furthermore one can take advantage in the fact that one knows the source timing in one's own simultaneous source acquisition and hence can test for source-consistent coherency in the estimated attributes.

Separation Method, Spatio-Temporal Dip Filters

Using the propagation direction information, one can derive a spatio-temporal dip-model of the interfering signals from different sources which can be used in a spatio-temporal dip-filter.

In case only individual record gathers are taken into account, one can still build a guiding mask of expected spatio-temporal propagation using e.g., source and receiver geometry. This spatio-temporal mask can then be used to filter the data, e.g., a spatio-temporal dip filter.

An Alternative Version

In a more sophisticated version, additional information from adjacent record gathers can be incorporated using the following steps:

1. Compare incidence angle and azimuth maps of two or more consecutive records taking into account at least the source times of one's own signals by matching the maps according to one source time or another.

Figure 7:
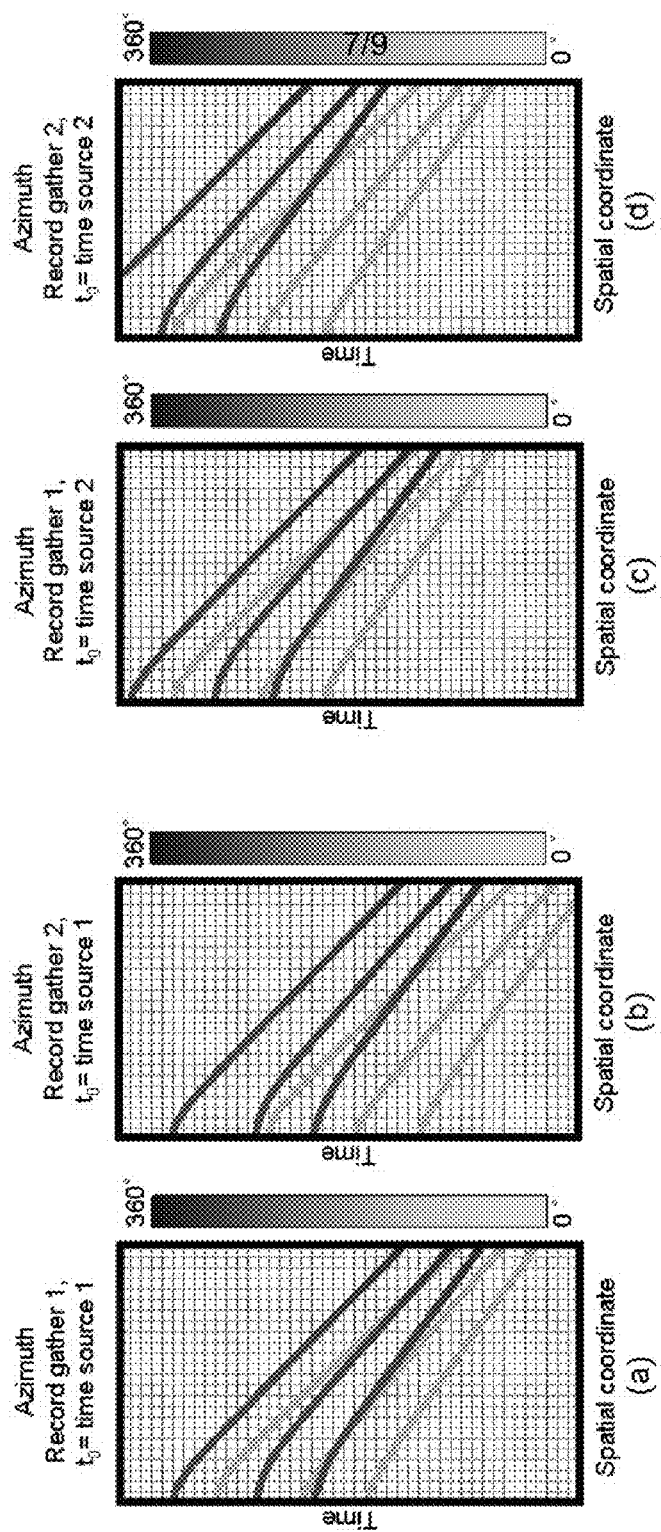
FIG. 7 shows a sketch of source-time-aligned propagation direction maps for two different records.

FIG. 7 shows an example, a sketch of source-time-matched propagation direction maps for two different records. In panel (a) and (b) the record gathers are matched and for display purposes aligned to the timing of the source 1 while in panel (c) and (d) the traces are aligned to the time of source 2. Coherent propagation directions present at similar time and space are associated with the source used to align the data. The dark grey events are events corresponding to source 1, the light grey events are events corresponding to source 2.

2. Identify spatio-temporal propagation directions that are present in the source-time-matched propagation direction maps and associate it with the corresponding source. More specifically, compare the propagation directions for every sample in a record with a window of samples in time and space around the matching sample in adjacent records. If the propagation direction of a sample (in space and the source specific aligned time) is consistent in adjacent records, it is associated to the source used to match the maps and output a propagation direction map associated with the individual source.

3. Use information from adjacent records to fill gaps in the source associated propagation direction map. For example, in FIG. 7(c), most of the light grey events from source 2 are masked by the dark grey event from source 1. The information from (d) can be used to fill the gaps or recreate the events corresponding to source 1 in the map of expected propagation directions for source 1. Alternatively, interpolation techniques can be applied to fill the gaps.

4. Filter data using the source associated maps of propagation directions (e.g., dip filters).

It is noted that in case the time of a second source is unknown (e.g., Seismic Interference) one can determine a time shift between the arrival of the seismic interference using cross correlation between adjacent seismic records.

Separation Method, Adaptive Subtraction

It is noted that step 2 and 3 of the flow above can also be changed to output actual waveforms. In other words one may build an attribute associated signal model using various techniques. For instance, that can be done by stacking a specified number of traces according to the propagation direction. Adaptively subtract each source associated signal model from the seismic data to separate the signal originated by the different sources.

It is noted that the decomposition methods listed above can be applied individually or in a combined manner. Furthermore, other decomposition methods/filters which are based on a spatio-temporal variant directional propagation attribute, e.g. azimuths and dips, can be used.

It is noted that the methods listed above can be applied to CSEM/MT data as well. For instance, the methods listed above are particularly valuable for the identification and removal of MT noise in CSEM acquisitions, CSEM interference of unrelated surveys, or CSEM simultaneous source acquisitions.

The methods described above are typically implemented in a computer system 1900, one of which is shown in FIG. 8. The system computer 1930 may be in communication with disk storage devices 1929, 1931, 1933 and 1935, which may be external hard disk storage devices. It is contemplated that disk storage devices 1929, 1931, 1933 and 1935 are conventional hard disk drives, and as such, will be implemented by way of a local area network or by remote access. Of course, while disk storage devices are illustrated as separate devices, a single disk storage device may be used to store any and all of the program instructions, measurement data, and results as desired.

In one implementation, seismic data from the seismic receivers may be stored in disk storage device 1931. Various non-seismic data from different sources may be stored in disk storage device 1933. The system computer 1930 may retrieve the appropriate data from the disk storage devices 1931 or 1933 to process data according to program instructions that correspond to implementations of various techniques described herein. The program instructions may be written in a computer programming language, such as C++, Java and the like. The program instructions may be stored in a computer-readable medium, such as program disk storage device 1935. Such computer-readable media may include computer storage media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 1930. Combinations of any of the above may also be included within the scope of computer readable media.

In one implementation, the system computer 1930 may present output primarily onto graphics display 1927, or alternatively via printer 1928 (not shown). The system computer 1930 may store the results of the methods described above on disk storage 1929, for later use and further analysis. The keyboard 1926 and the pointing device (e.g., a mouse, trackball, or the like) 1925 may be provided with the system computer 1930 to enable interactive operation.

The system computer 1930 may be located at a data center remote from an exploration field. The system computer 1930 may be in communication with equipment on site to receive data of various measurements. The system computer 1930 may also be located on site in a field to provide faster feedback and guidance for the field operation. Such data, after conventional formatting and other initial processing, may be stored by the system computer 1930 as digital data in the disk storage 1931 or 1933 for subsequent retrieval and processing in the manner described above. While FIG. 19 illustrates the disk storage, e.g. 1931 as directly connected to the system computer 1930, it is also contemplated that the disk storage device may be accessible through a local area network or by remote access. Furthermore, while disk storage devices 1929, 1931 are illustrated as separate devices for storing input seismic data and analysis results, the disk storage devices 1929, 1931 may be implemented within a single disk drive (either together with or separately from program disk storage device 1933), or in any other conventional manner as will be fully understood by one of skill in the art having reference to this specification.

While illustrative embodiments of the invention have been illustrated and described, it will be appreciated that various changes can be made therein without departing from the spirit and scope of the invention.

The invention claimed is:

1. A method comprising:
   receiving data representing energy sensed by receivers in response to energy being produced by a plurality of seismic sources;
   determining a dependence of at least one directional propagation attribute of the sensed energy on at least one of time and space;
   processing data in a processor-based machine to sort the data based at least in part on the determined dependence and attributing a portion of the sensed energy to a given seismic source of the plurality of seismic sources based at least in part on the sorted data; and
   processing the sorted data to determine information about a geological formation,
   wherein processing the data in the processor-based machine to sort the data based at least in part on at least one directional propagation attribute and attributing a portion of the sensed energy to the given seismic source of the plurality of seismic sources comprises:
   using a matching pursuit-based technique to determine the at least one directional propagation attribute; or
   determining the at least one directional propagation attribute based on an inline and a crossline slowness.

2. The method of claim 1, wherein the at least one directional propagation attribute is selected from a group of incidence angle, azimuth and their combinations.

3. The method of claim 2, wherein the attribute is determined using single-component data from a 3D survey.

4. The method of claim 2, wherein the attribute is determined using multiple-component data from at least one receiver.

5. The method of claim 4, wherein the multiple-component data comprises:
   at least one pressure component and at least one particle motion component; or
   at least one pressure component and at least one spatial derivative of the pressure component.

6. The method of claim 1, wherein the geophysical exploration comprises a seismic exploration on land or in sea or in transition zones.

7. The method of claim 1, wherein processing the data in the processor-based machine to sort the data based on the at least one directional propagation attribute comprises using iterative subtraction via a matching pursuit-based technique to determine the at least one directional propagation attribute.

8. The method of claim 7, wherein processing the data in the processor-based machine to sort the data comprises using the matching pursuit-based technique to sort the responses corresponding to the plurality of seismic sources.

9. The method of claim 1, wherein processing the data in the processor-based machine to sort the data comprises performing an iterative subtraction via a matching pursuit-based technique.

10. The method of claim 1, wherein processing the data in the processor-based machine to sort the data comprises performing spatio-temporal dip filtering.

11. The method of claim 10, wherein performing spatio-temporal dip filtering comprises:
    comparing at least one attribute of two or more consecutive records matching them according to source times;
    using information from adjacent records to fill gaps in a source associated propagation direction map; and
    filtering responses using the source associated propagation direction map.

12. The method of claim 10, wherein performing spatio-temporal dip filtering comprises:
    using information from interpolating at least one attribute to fill gaps in a source associated propagation direction map; and
    filtering responses using the source associated propagation direction map.

13. The method of claim 10, wherein performing spatio-temporal dip filtering comprises:
    comparing at least one attribute of two or more consecutive records matching them according to source times; and
    building an attribute associated signal model according to a propagation direction.

14. The method of claim 1, wherein the data represents data acquired in a controlled source electromagnetic survey or an MT exploration survey performed on land, in sea or in a transition zone.

15. The method of claim 1, wherein determining the dependence of at least one directional propagation attribute of the sensed energy on at least one of time and space comprising determining how the at least one directional propagation attribute varies with respect to at least one of time and space.

16. A system comprising:
    data storage storing data representing energy sensed by the receivers in response to energy being produced by a plurality of seismic sources; and
    a processor to determine a dependence of at least one directional propagation attribute of the sensed energy on at least one of time and space, sort the data based at least in part on the determined dependence, and attribute a portion of the sensed energy to a given seismic source of the plurality of seismic sources based at least in part on the sorted data, wherein said at least one processor processes the sorted data to determine information about a geological formation and the processor:
  uses a matching pursuit-based technique to determine the at least one directional propagation attribute; or
  determines the at least one directional propagation attribute based on an inline and a crossline slowness.

* * * * *